United States Patent [19]

Hsech-Pen

[11] Patent Number: 4,649,284
[45] Date of Patent: Mar. 10, 1987

[54] WINDMILL

[76] Inventor: Leu Hsech-Pen, P.O. Box 16-317, Taipei, Taiwan

[21] Appl. No.: 699,445

[22] Filed: Feb. 7, 1985

[51] Int. Cl.[4] .............................. F03D 9/00; F02P 9/04
[52] U.S. Cl. ....................................... 290/55; 416/117
[58] Field of Search ....................... 290/44, 55, 43, 54; 416/117, 197 A

[56] References Cited

U.S. PATENT DOCUMENTS

| | | | |
|---|---|---|---|
| 1,111,350 | 9/1914 | Bayley | 416/117 |
| 4,112,311 | 9/1978 | Theyse | 290/55 X |
| 4,245,958 | 1/1981 | Ewers | 416/197 A |

Primary Examiner—L. T. Hix
Assistant Examiner—Brian W. Brown

[57] ABSTRACT

A windmill includes a supporting frame, a vertical transmission shaft rotatably mounted in the supporting frame, a plurality of fan blades, each having two bending edges longitudinally formed on the two vertical edges of the blade, horizontally pivotedly mounted on the vertical transmission shaft, a sweeping cleaner formed on the lower portion of the transmission shaft to remove the snow or dirts on a power generator, a power generator formed on the lower end of the transmission shaft, and a high-speed braking clutch automatically braking the rotation of the transmission shaft under stronger wind pressure for safely protecting the power generator.

3 Claims, 6 Drawing Figures

WINDMILL

BACKGROUND OF THE INVENTION

In a conventional windmill, there are provided with a plurality of fan blades fixed on a transmission shaft to be blown by wind for producing power, which however, if being made as flat shape, will not efficiently "catch" the wind since the wind will "escape" from the flat edges of a fan blade, to thereby reduce the efficiency of power generation.

When the natural wind blows very strongly, such a strong wind may cause damage or influence the stability of the power generator and a clutch means to automatically brake the fan shaft of the power generator will be expected for the safety purpose of such a windmill.

The present inventor has known these phenomena of a conventional windmill and invented the present windmill.

SUMMARY OF THE INVENTION

The object of the present invention is to provide a windmill including a supporting frame, a plurality of vertical shaft portions coaxially connected in series to form an overall transmission shaft rotatably mounted in the supporting frame, a plurality of fan blades each transversely pivotedly mounted on the vertical shaft portion, a sweeping cleaner fixed on the lower portion of the transmission shaft, a power generator driven by the transmission shaft and a high-speed braking clutch operatively disengaging the power generator from the transmission shaft, wherein each fan blade is formed with two bending edges longitudinally extending on the two vertical edges of each blade to "catch" the blowing wind to increase the conversion of wind force to an electric energy through the power generator as driven by the transmission shaft, and the high-speed braking clutch will be actuated under strong wind force to automatically brake the transmission shaft and power generator to enhance the stability and safety of the power generator.

DETAILED DESCRIPTION

Figure 1:
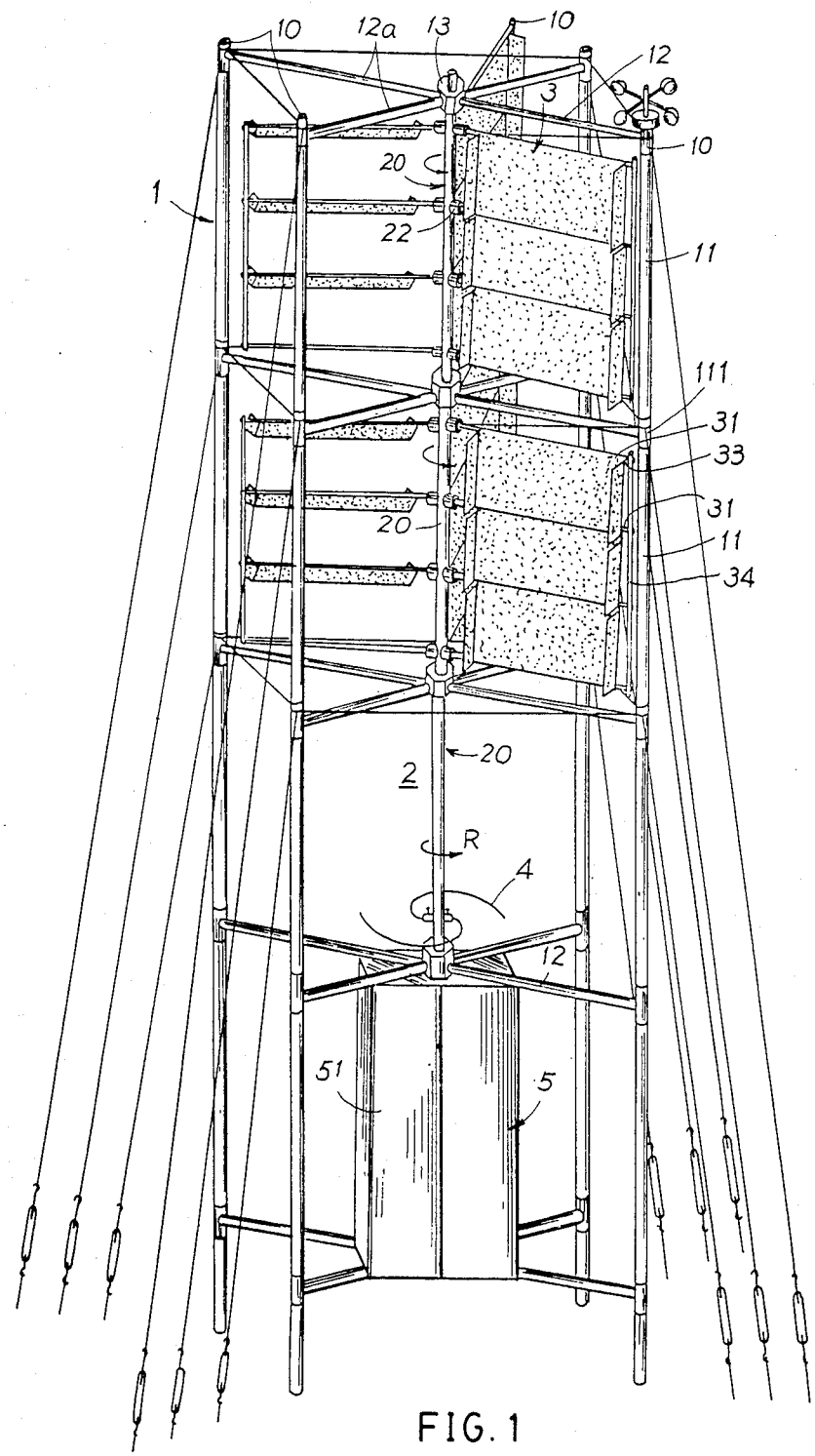
FIG. 1 is a perspective drawing of the present invention.
Figure 2:
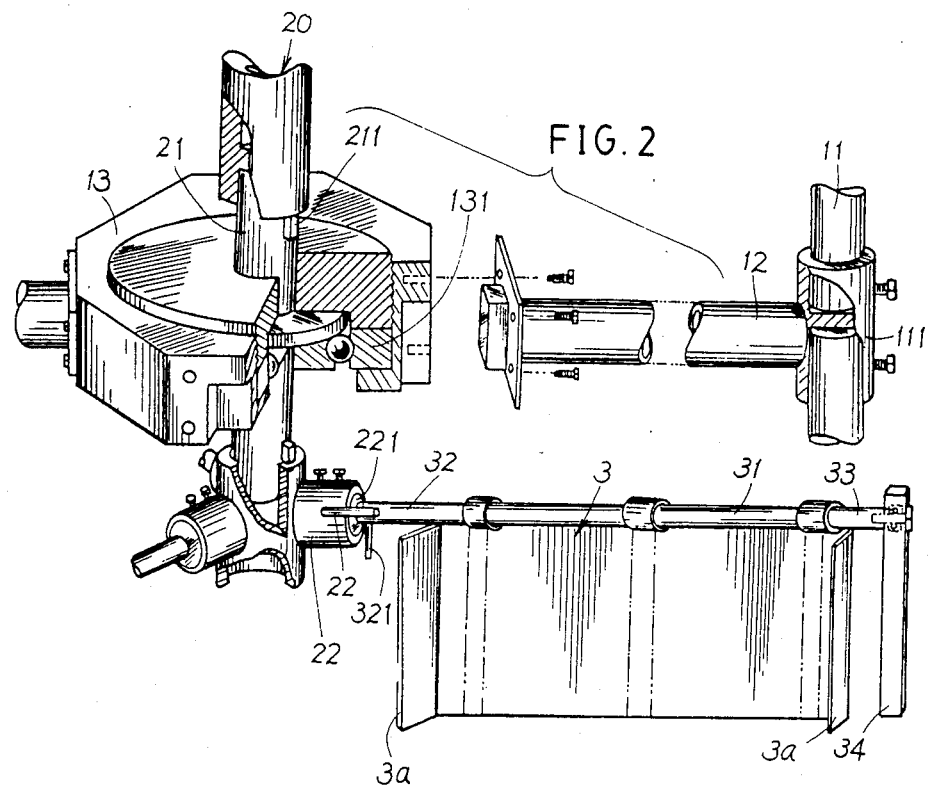
FIG. 2 shows the fixation of the supporting frame of the present invention.
Figure 3:
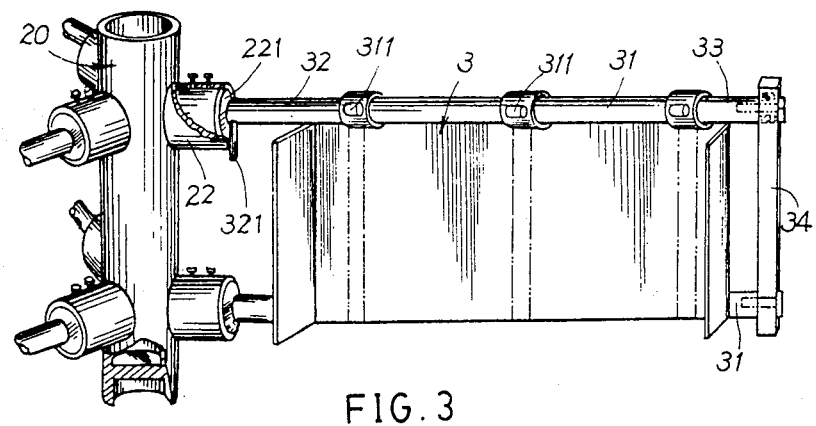
FIG. 3 is an illustration showing the assembly of the fan blade on the transmission shaft in accordance with the present invention.

As shown in the figures, the present invention comprises: a supporting frame 1, a plurality of vertical shaft portions 20 coaxially connected in series to form an integrated vertical transmission shaft 2, a plurality of fan blades 3 each transversely pivotedly mounted on the vertical shaft portion 20, a sweeping cleaner 4 fixed on the lower portion of the transmission shaft 2, a power generator 5 driven by the transmission shaft 2 and formed on the lower end of the shaft 2, and a high-speed braking clutch 6 operatively braking the rotation of the power generator 5 and the shaft 2.

The supporting frame 1 includes: a plurality of vertical rods 11 every two neighboring rods 11 vertically connected by a connector 111 to form at least four vertical columns 10 supported on a ground floor, and a plurality of horizontal rods 12 of which every set of four rods 12 forming a bracing cross 12a which is formed with a central bushing 13 having a bearing 131 therein for rotatably mounting each vertical shaft portion 20. Every four vertical rods 11 and every two sets of bracing cross 12a overlapped projectively define a story of supporting frame 1 such as: A, B, C, D shown in FIG. 1. So many stories of supporting frame 1 can be vertically built by coupling the upper rod 11 with the lower rod 11 by a connector 111 to increase the wind receiving area so as to increase the output energy as developed by this invention.

Every two vertical shaft portions 20 are respectively connected with the upper portion and the lower portion of a coupler 21 by a pair of latches 211 which is rotatably mounted in a central bushing 13. Several vertical shaft portions 20 may be coupled to form an integrated vertical transmission shaft 2. The more the shaft portions 20 are connected, the higher the present invention will be built. Every vertical shaft portion 20 is formed with a plurality of horizontal bushes 22 every three bushes 22 coplanely transversely extending on the central shaft portion 20 and each including a roller bearing 221 for pivotedly mounting each fan blade 3 therein and a limiting rod 222 transversely extending outwards from the bush 22.

Each fan blade 3 includes: two bending edges 3a longitudinally formed on the two vertical edges of the fan blade and protruding frontwards in a direction opposite to the rotating direction of the fan blade, and a horizontal shaft 31 fixing the fan blade having its inner end 31 pivotedly mounted in the roller bearing 221 of the horizontal bush 32 and having its outer end 33 pivotedly mounted in a vertical link 34. Every three fan blades 3 as shown in FIG. 1 may be pivotedly mounted on a vertical shaft portion 20 to form a row of fan blades and three rows of fan blades 3 may be longitudinally formed on the shaft poriton 20. The height of each fan blade 3 should be slightly larger than the distance between every two neighboring shafts 31 and four shafts 31 must be provided in this invention for each vertical shaft portion 20 so that when subjecting to wind pressure the lower edge of the upper fan blade 3 may be obstructed by a lower shaft 31 fixing the lower fan blade 3, the fan blades will be forced to rotate the shaft 2 of this invention for power generation. The lowest shaft 31 is designed to exclude the fan blade 3 to serve as an obstructing rod for the lowest fan blade. Each link 34 is pivotedly mounted with four shafts 31 longitudinally disposed to suspensively hold the shafts 31 about the shaft 2. Each shaft 31 is formed with several cushioning pads 311 thereon to buffer the impact strength of each fan blade 3 when hitting on each shaft 31. As shown in FIG. 1, there are three rows of fan blades longitudinally fixed on the shaft portion 20. A vertical rod 321 is formed under the inner end 32 of shaft 31, which is operatively obstructed against the limiting rod 222 on bush 22 when feathering the fan blade 3.

On the lower portion of the shaft 2 there is provided a sweeping cleaner 4 which includes at least a pair of coiled sweepers to remove the snow, dusts, dirts, or any matter possibly accumulated on the power generator 5.

Figure 4:
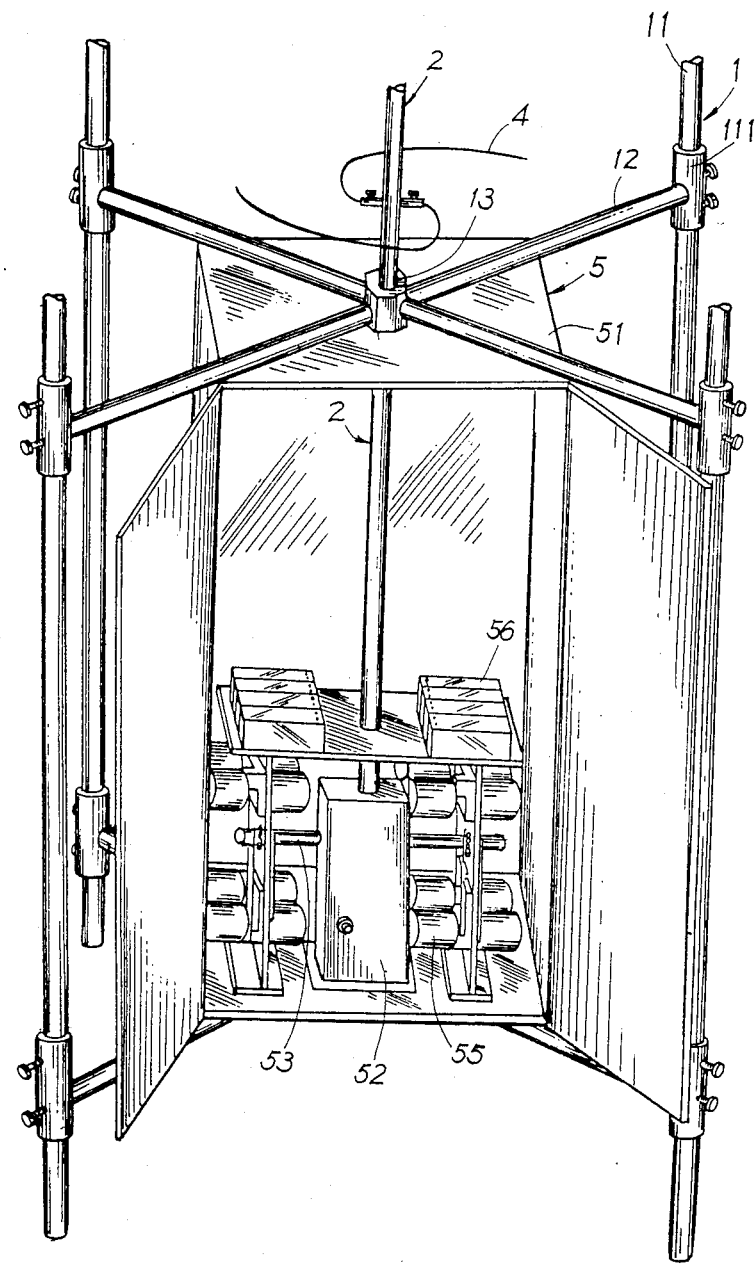
FIG. 4 is an illustration showing the power generator of the present invention.
Figure 5:
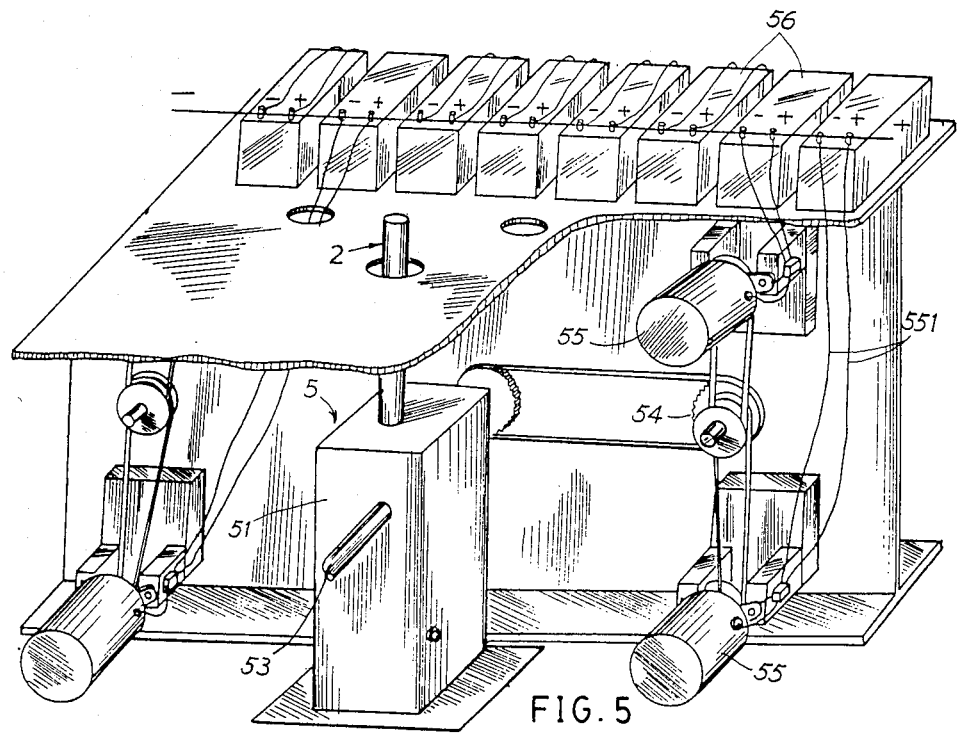
FIG. 5 shows the power generation in accordance with the present invention.

The power generator 5, as shown in FIGS. 4 and 5, includes a casing 51, a set of gears 52 for accelerating the rotation speed of shaft 2, a horizontal transmission shaft 53 engageable with the set of gears 52, a plurality of alternators 55 driven by the horizontal transmission shaft 53 through the belt means 54, and a plurality of batteries 56 electrically connected with the alternators 55 for the output of direct-current power. Naturally, the present invention may also produce alternative-current power if modified by those skilled in the art.

Figure 6:
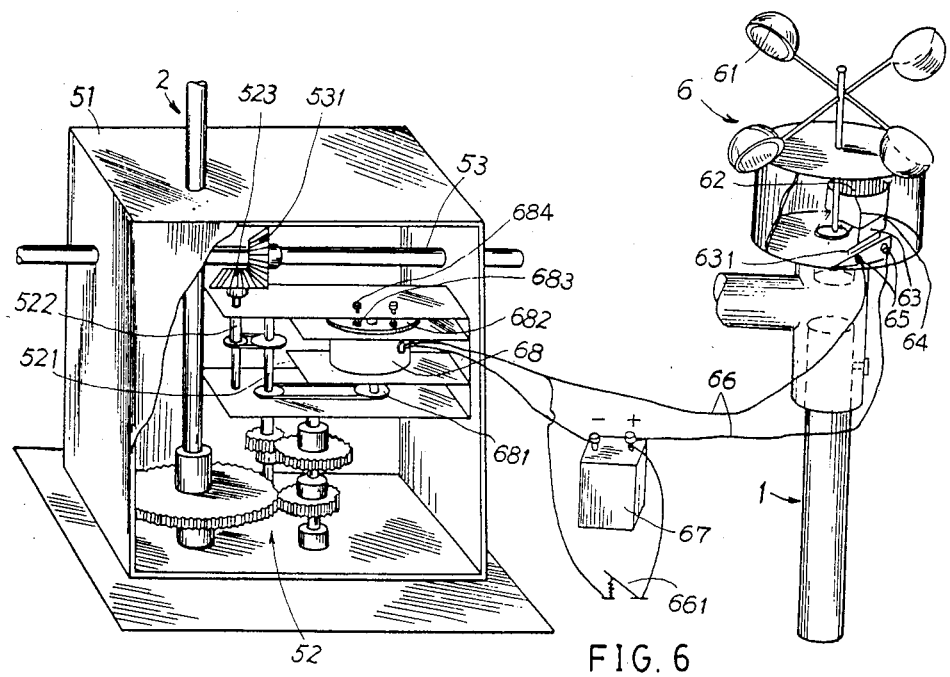
FIG. 6 shows the clutch of the present invention.

The high-speed braking clutch 6 as shown in FIG. 6 includes: a plurality of semi-spherical cups 61 fixed on the highest frame 1, a blower 62 driven by the cups 61 under wind pressure, a wind-opening door 63 operatively opened by blower 62 and resiliently held by a spring 64 having a conductive pusher 631, a pair of electric contactors 65 operatively contacted by the pusher 631, a pair of wires 66 connected with a power source 67 which is manually operated by a switch 661, and an electromagnetic-operating clutch 68 having a lower pulley 681 formed on the lower end of a clutch shaft and coupled to a gear shaft 521 of the gear set 52, a braking disc 682 formed on the top portion of a clutch shaft, and a plurality of screws 683 having the screw ends fixed with rubber pads 684 which will frictionally brake the disc 682 when the wind is so strong to exert a big wind pressure from the blower 62 to outwards push the pusher 631 for closing a power source of the clutch 68 to thereby electromagnetically engage the clutch shaft with a gear shaft 521 of the gear set 52 as driven by the transmission shaft 2 for braking the rotation of said shafts 2 and 53 for safety operation of the present invention.

The set of gears 52 is formed with a plurality of gears designed to accelerate the rotation speed of the shaft 2 and includes a gear shaft 521 operatively coupled to the clutch 68 and an output shaft 522 driven by the shaft 521 having a bevel gear 523 thereon to engage with a bevel gear 531 formed on the horizontal transmission shaft 53.

The present invention has the following advantages in comparison with the conventional windmill:

1. The fan blade 3 having two bending edges 3a will increase its wind "catching" capability to increase the power generation for this invention. The pair of rods 321, 222 will help the fan blade when feathered on the left side of the shaft 2 as shown in FIG. 1 to be quickly vertically pendant for next wind-receiving and for driving shaft 2 rotatively.
2. The braking clutch 6 may automatically brake the gear set of the transmission shaft 2 for safety measure.
3. The sweeping cleaner 4 may remove the snow, dirts, dusts, etc., for better housekeeping of the present invention.

The rods 321,222 of the present invention may be modified to have the same function to quickly recover the feathered fan blade to its vertical state by those skilled in the art and such a modification is still fallen within the scope of this invention.

What I claim is:

1. A windmill comprising:
    a supporting frame;
    a plurality of vertical shaft portions coaxially connected in series to form an integrated vertical transmission shaft rotatably mounted in said supporting frame;
    a plurality of fan blades each transversely pivotedly mounted on said vertical shaft portion;
    a sweeping cleaner fixed on the lower portion of said vertical transmission shaft;
    a power generator having a set of gears for accelerating rotation speed as driven by said vertical transmission shaft and formed on the lower end of said transmission shaft; and
    a high-speed braking clutch operatively braking the rotation of said transmission shaft and said power generator,
    the improvement which comprises:
    said fan blade formed with two bending edges respectively longitudinally protruding from the two vertical edges of said fan blade in a direction opposite to the rotation direction of said fan blade under wind pressure, and formed with a horizontal shaft having its inner end pivotedly mounted in a roller bearing within a horizontal bush of said vertical shaft portion and having its outer end pivotedly mounted in a vertical link suspensively holding the horizontal shaft about said vertical shaft portion, said inner end of said horizontal shaft of said fan blade formed with a vertical rod thereunder to be operatively obstructed by a limiting rod transversely extending outwards from said horizontal bush of said vertical shaft portion when feathering said fan blade.

2. A windmill according to claim 1, wherein said high-speed braking clutch includes a plurality of semi-spherical cups fixed on the highest position of said supporting frame, a blower driven by said cups under wind pressure, a wind-opening door resiliently held by a spring as subjected to be opened by said blower under stronger wind and having a conductive pusher, a pair of contactors operatively contacted by said pusher, a pair of wires connected with a power source and an electromagnetically-operating clutch having a lower pulley formed on the lower end of a clutch shaft coupled to a gear shaft of said set of gears of said power generator, a braking disc formed on the upper end of said clutch shaft and a plurality of screws fixed with rubber pads thereunder to frictionally brake said braking disc and said clutch shaft, to thereby brake the set of gears of said power generator.

3. A windmill according to claim 1, wherein said sweeping cleaner is formed with at least a pair of coiled sweepers fixed on said vertical transmission shaft.

* * * * *